United States Patent
Wada et al.

(10) Patent No.: US 10,072,696 B2
(45) Date of Patent: Sep. 11, 2018

(54) DETACHING METHOD OF FILLING MEMBER AND FILLING MEMBER USED THEREIN AND CUTTER BLADE USING THIS FILLING MEMBER

(75) Inventors: Naoya Wada, Hyogo (JP); Akira Sugimoto, Hyogo (JP); Kazufumi Sakata, Hyogo (JP)

(73) Assignee: KABUSHIKI KAISHA KINKI, Hyogo (JP)

( * ) Notice: Subject to any disclaimer, the term of this patent is extended or adjusted under 35 U.S.C. 154(b) by 16 days.

(21) Appl. No.: 14/382,430

(22) PCT Filed: Mar. 7, 2012

(86) PCT No.: PCT/JP2012/055835
§ 371 (c)(1),
(2), (4) Date: Feb. 25, 2015

(87) PCT Pub. No.: WO2013/132617
PCT Pub. Date: Sep. 12, 2013

(65) Prior Publication Data
US 2015/0204373 A1    Jul. 23, 2015

(51) Int. Cl.
*B23P 19/02* (2006.01)
*F16B 39/02* (2006.01)
(Continued)

(52) U.S. Cl.
CPC ............ *F16B 39/021* (2013.01); *B02C 18/18* (2013.01); *F16B 37/14* (2013.01); *Y10T 29/49815* (2015.01)

(58) Field of Classification Search
CPC ......... Y10T 29/49815; Y10T 29/49817; Y10T 29/49821; Y10T 29/49822;
(Continued)

(56) References Cited

U.S. PATENT DOCUMENTS

| 2,752,671 A | * | 7/1956 | Alyea | ..................... B25B 27/18 |
| | | | | 29/240 |
| 3,071,848 A | * | 1/1963 | Lawry | ..................... B25B 27/06 |
| | | | | 29/267 |

(Continued)

FOREIGN PATENT DOCUMENTS

| JP | 2-131997 | 1/1990 |
| JP | 8-334121 | 12/1996 |

(Continued)

OTHER PUBLICATIONS

Written Opinion of the International Searching Authority dated Jun. 19, 2012 in corresponding International Application No. PCT/JP2012/055835.

*Primary Examiner* — Christopher Besler
(74) *Attorney, Agent, or Firm* — Wenderoth, Lind & Ponack, L.L.P.

(57) ABSTRACT

A detaching method of a filling member and the filling member to be used therein are provided, in which the filling member loaded in a space of a counterbore hole or a hole of a bolt head may be detached easily if required to remove a bolt, a prepared hole is made in the filling member by means of a drill, and female threads are formed in the filling member by a tapping process, and an extracting force is applied to the filling member by way of the female threads engaged with a rotating tap, so that the filling member can be pulled out of the space of the counterbore hole.

9 Claims, 17 Drawing Sheets

(51) Int. Cl.
*B02C 18/18* (2006.01)
*F16B 37/14* (2006.01)

(58) Field of Classification Search
CPC ......... Y10T 29/49824; Y10T 29/53848; Y10T 29/53796; Y10T 29/53896; Y10T 29/539; Y10T 29/53943; B23P 19/02; B23P 19/022; B23P 19/025; B25B 27/02; B67B 7/06; B67B 7/08; B67B 7/02; B67B 7/0411; B67B 7/0417; F16B 37/14
USPC ................. 411/377, 372, 372.6; 83/839, 840
See application file for complete search history.

(56) References Cited

U.S. PATENT DOCUMENTS

| | | | | |
|---|---|---|---|---|
| 3,192,803 | A * | 7/1965 | Federighi | B67B 7/08 81/3.2 |
| 3,508,321 | A * | 4/1970 | Wood | B25B 27/18 29/426.4 |
| 4,800,637 | A * | 1/1989 | Overbay | B23P 11/02 29/402.03 |
| 5,012,703 | A * | 5/1991 | Reinbacher | B67B 7/08 81/3.2 |
| 5,022,136 | A * | 6/1991 | Tremmel | B23P 11/00 29/283.5 |
| 5,127,145 | A * | 7/1992 | Ross | B25B 27/0028 29/235 |
| 5,517,740 | A * | 5/1996 | Costlow | B23P 19/025 173/17 |
| 5,524,785 | A * | 6/1996 | Georges | F16B 37/12 138/96 T |
| 5,931,367 | A * | 8/1999 | Sato | B23K 20/106 156/580.1 |
| 6,155,753 | A * | 12/2000 | Chang | B23B 27/1681 407/103 |
| 6,189,212 | B1 * | 2/2001 | Hawkins | B23P 19/025 29/723 |
| 7,231,850 | B2 * | 6/2007 | Wang | B67B 7/08 81/3.2 |
| 7,431,560 | B2 * | 10/2008 | Sterner | F01D 17/165 415/160 |
| 7,555,820 | B2 * | 7/2009 | McEldowney | B21J 15/50 29/426.4 |
| 8,281,469 | B2 * | 10/2012 | King | B25B 27/02 29/235 |
| 8,661,637 | B2 * | 3/2014 | King | B25B 27/02 29/235 |
| 2002/0152599 | A1 * | 10/2002 | Pai | B25B 27/18 29/426.1 |
| 2004/0112177 | A1 * | 6/2004 | Yip | B67B 7/0441 81/3.48 |
| 2006/0249517 | A1 * | 11/2006 | Bersegol | G21F 5/06 220/656 |
| 2008/0276438 | A1 * | 11/2008 | King | B25B 27/02 29/255 |
| 2009/0253818 | A1 * | 10/2009 | Kimura | B65D 39/0011 521/140 |
| 2011/0000064 | A1 * | 1/2011 | Weigel, Jr. | B21J 15/50 29/426.4 |
| 2013/0283581 | A1 * | 10/2013 | Burr | B67B 7/0411 29/235 |
| 2015/0204373 | A1 * | 7/2015 | Wada | B02C 18/18 29/426.1 |

FOREIGN PATENT DOCUMENTS

| | | |
|---|---|---|
| JP | 11-37127 | 2/1999 |
| JP | 2001-24763 | 1/2001 |
| JP | 2001-106295 | 4/2001 |
| JP | 2003-237891 | 8/2003 |
| JP | 2003-300595 | 10/2003 |
| JP | 3112726 | 7/2005 |
| JP | 2006-512570 | 4/2006 |

* cited by examiner

FIG. 1(a)    FIG. 1(b)    FIG. 1(c)
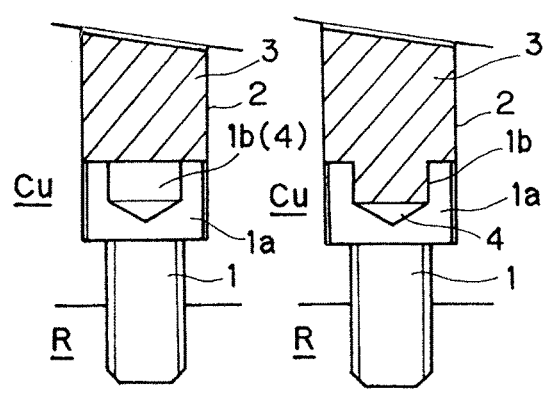
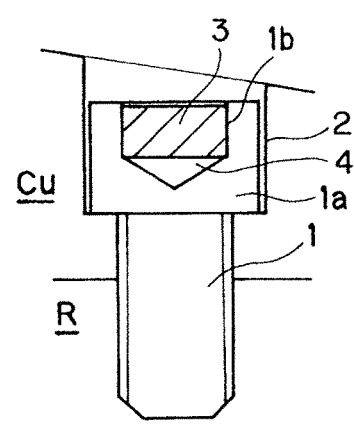

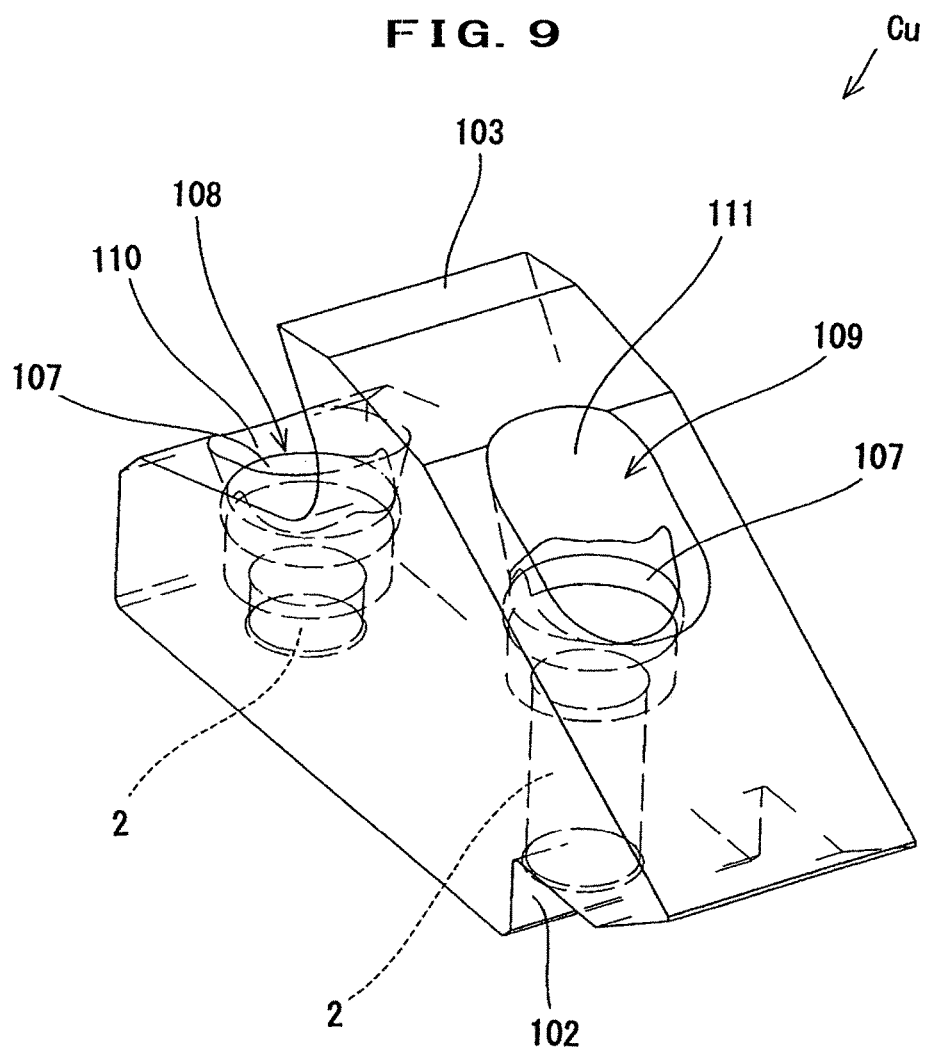

DETACHING METHOD OF FILLING MEMBER AND FILLING MEMBER USED THEREIN AND CUTTER BLADE USING THIS FILLING MEMBER

TECHNICAL FIELD

The present invention relates to a detaching method of a filling member filling a space of a counterbore hole in which a bolt is loaded so that a bolt head may sink inside of a counterbore hole, or a filling member filling a hole of a bolt head of a hexagon socket head bolt (to be turned and operated by a tool, including cross hole, other groove or hole in the specification), and the filling member used therein, and a cutter blade making use of this filling member.

BACKGROUND ART

Conventionally, in order to prevent entry of foreign matter into a space of a counterbore hole or a hole of a bolt head, by flattening the position of the counterbore hole or the hole of the bolt head of a socket head bolt, with the bolt loaded so that the bolt head may sink into the inside of the counterbore hole, it has been proposed to fill the space of the counterbore hole or the hole of the bolt head with a filling member (including plug member) (see Japanese Patent Application No. 8-334121 and Japanese Patent Application No. 11-37127).

On the other hand, when the space of the counterbore hole or the hole of the bolt head is filled with a filling member in a tight state, entry of foreign matter can be prevented, but at the same time, for example, in the case of a grinder having a cutter blade mounted on a rotating element main body by a bolt so as to be exchangeable, it is difficult to repair or replace the members, and it is time-consuming.

To the contrary, when filled with the filling member in a loose state, the filling member may be detached during use, and the initial objective of prevention of entry of foreign matter may not be achieved.

SUMMARY OF THE INVENTION

Problems to Be Solved by the Invention

The present invention is devised in the light of the problems of the prior art of the member applied to fill the space of the counterbore hole or the hole of the bolt head, and it is an object thereof to present a detaching method of a member easy to repair or replace members by facilitating detaching of a filling member applied to fill the space of the counterbore hole or hole of the bolt head in a tight state when necessary to detach the bolt, a filling member used therein, and a cutter blade using this filling member.

Means for Solving the Problems

To achieve this object, a detaching method of a filling member of a first invention of the present application relates to a method of detaching a filling member applied to fill in a space of a counterbore hole having a bolt loaded so that the bolt head may sink into the inside of the counterbore hole and/or a filling member applied to fill in a hole of the bolt head of a socket head bolt, from the space of the counterbore hole and/or the hole of the bolt head, in which by applying an extracting force to the filling member, the filling member is extracted from the space of the counterbore hole and/or the hole of the bolt head.

In this case, while female threads are formed in the filling member by tapping, an extracting force is applied to the filling member through the female threads engaged with the rotating tap, the screw can be driven into the filling member, or an extracting force can be applied to the filling member by way of the screw.

To achieve the same object, moreover, a detaching method of a filling member of a second invention of the present application relates to a method of detaching a filling member applied to fill in a space of a counterbore hole having a bolt loaded so that the bolt head may sink into the inside of the counterbore hole and/or a filling member applied to fill in a hole of the bolt head of a socket head bolt, from the space of the counterbore hole and/or the hole of the bolt head, in which by applying a pushing force to the filling member from the bottom side of the counterbore hole and/or the hole of the bolt head, the filling member is pushed out from the space of the counterbore hole and/or the hole of the bolt head.

In this case, when applying the filling member to fill in the space of the counterbore hole and/or the hole of the bolt head, preliminarily a blind plug is interposed between the bottom of the bolt head and/or the bolt head hole and the filling member, and a pushing force is applied to the filling member, or a fluid is introduced between the bottom of the bolt head and/or the bolt head hole and the filling member, so that a pushing force is applied to the filling member by the pressure of this fluid.

The filling member of the invention used in the detaching method of the invention is composed of a preliminarily formed synthetic resin of the filling member.

In this case, the dimension of the filling member is defined so as to be larger by 0.5 to 1.5% than the dimension of the opening of the counterbore hole loading the bolt in which the filling member is filled or the hole of the bolt head of the socket head bolt.

The filling member may be also composed of a fiber-reinforced polyamide resin.

The bottom of the filling member may be formed in a flat surface.

The cutter blade of the invention is built in to fill in the counterbore hole loaded with the bolt or the hole of the bolt hole of a socket head bolt.

In this case, the counterbore hole loaded with a bolt has a slope spreading toward the outer side of the cutter blade from a position of a specified depth of the counterbore hole.

Effects of the Invention

According to the detaching method of a filling member of the invention, the filling member used therein, and the cutter blade using this filling member, the filling member applied to fill in the space of the counterbore hole or the hole of the bolt hole in a tight state can be easily detached when it is necessary to remove the bolt.

As a result, for example, in a case of a grinder having a blade member mounted on a rotating element main body by a bolt so as to be exchangeable, by filling with the filling member in a tight state so that the filling member may not be detached during use, the position of the counterbore hole or the hole of the bolt head is formed in a flat surface, and while entry of foreign matter into the space of the counterbore hole or the hole of the bolt head is prevented securely, when removing the bolt and repairing or replacing the member, the filling member may be easily detached by applying the detaching method of a filling member of the first or second invention of the present application, the bolt can be removed, and the member may be repaired or replaced easily The filling member may be composed of a preliminarily formed synthetic resin, and in particular, the dimension of the filling member is defined so as to be larger by 0.5 to 1.5% than the dimension of the opening of the counterbore hole loading the bolt in which the filling member is filled or the hole of the bolt head of the socket head bolt, and therefore the filling member may be installed or detached or attached easily, and releasing of the filling member during use can be prevented securely.

By using a fiber-reinforced polyamide resin for making the filling member, wear of the filling member during use can be reduced.

By forming the bottom of the filling member in a flat surface, a space can be formed inside of the position of installing the filling member of the counterbore hole loaded with the bolt or the hole of the bolt head of the socket head bolt, so that the filling member may be detached easily.

In addition, since the counterbore hole loaded with a bolt has a slope spreading toward the outer side of the cutter blade from a position of a specified depth of the counterbore hole, broken chips or foreign matter penetrating into the counterbore hole loaded with the bolt can be removed easily, and if the counterbore hole is clogged with foreign matter getting into the counterbore hole can be easily removed, and the cutter blade can be replaced easily.

BRIEF DESCRIPTION OF THE DRAWINGS

FIG. 1 is an explanatory diagram showing a form of a representative counterbore hole part applying a detaching method of a filling member of the present invention.

FIG. 9 is a perspective view of the cutter blade shown in FIG. 8.

FIG. 18 is a perspective view of the cutter blade shown in FIG. 17.

BEST MODE FOR CARRYING OUT THE INVENTION

Figures 2A, 2B:
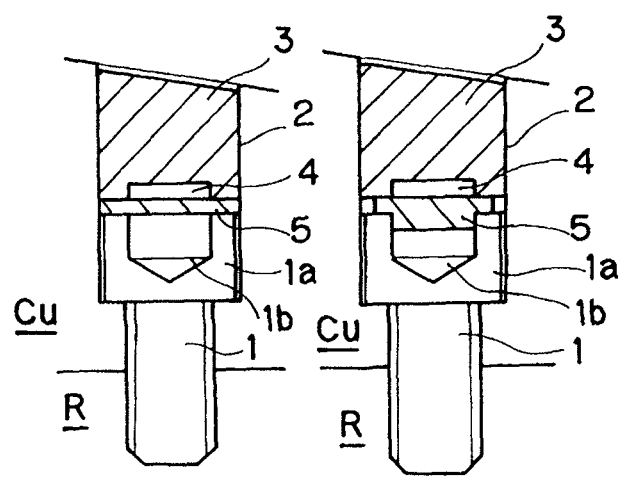
FIG. 2 is an explanatory diagram showing a modified form of a counterbore hole applying a detaching method of a filling member of the present invention.

Hereinafter, embodiments of a detaching method of a filling member of the present invention, a filling member used therein, and a cutter blade using this filling member are specifically described below on the basis of the accompanying drawings.

FIG. 1 shows a form of a representative counterbore hole part applying a detaching method of a filling member of the present invention.

FIG. 1 shows a sectional view of an essential part of a grinder in which a blade member Cu is mounted on a rotating element main body R by a bolt 1 so as to be exchangeable, in which FIG. 1 (a) shows an example of filling of a space of a counterbore hole 2 loaded with a bolt 1 so that a bolt head 1a may sink into the inside of the counterbore hole 2 with a filling member 3, FIG. 1 (b) shows an example of filling of a space of a counterbore hole 2 loaded with a bolt 1 so that a bolt head 1a may sink into the inside of the counterbore hole 2 and a hole 1b of the bolt head 1a with a filling member 3, and FIG. 1 (c) shows an example of filling of a hole 1b of a bolt hole 1a loaded with a bolt 1 so that the bolt head 1a may sink slightly in the inside of the counterbore hole 2 (herein the bolt head 1a may be exposed or not) with a filling member 3 (in this case, since the risk of entry of foreign matter into the space of the counterbore hole 2 loaded with the bolt 1 is low, this space is not filled with the filling member 3).

In this case, to realize a smooth operation of the detaching method of a filling member of the present invention, a space 4 is formed inside of the position of loading of the filling member 3.

This space 4 is formed in whole or part of the hole 1b of the bolt head 1a in the modes shown in FIG. 1 (a) to (c).

FIG. 2 shows a modified example of the counterbore hole portion in which the detaching method of a filling member of the present invention is applied.

FIG. 2 shows an example of filling of a space of the counterbore hole 2 loaded with the bolt 1 so that the bolt head 1a may sink inside of the counterbore hole 2 with the filling member 3, in which FIG. 2 (a) shows an example of filling with the filling member 3 by disposing a flat isolation member 5 so as to close the hole 1b of the bolt head 1a, and FIG. 2 (b) shows an example of filling with the filling member 3 by disposing a flat isolation member 5 having a rib for closing the hole 1b with the rib inserted into the hole 1b of the bolt head 1a.

In this case, the isolation member 5 is preferably made of a material stiffer than the filling member 3.

Moreover, to realize a smooth operation of the detaching method of a filling member of the present invention, a space 4 is formed in an inner bottom of the filling member 3.

The filling member 3 may be either preliminarily formed material or filled and solidified material.

Generally the filling member 3 is required to have various functions, such as wear resistance, pressure resistance, heat resistance, or corrosion resistance.

Specifically, preliminarily formed materials include polyolefin resin, polyamide resin, polyurethane resin, silicone resin, and other synthetic resins, and matrix materials include various fiber-reinforced plastics of glass fibers using unsaturated polyester, epoxy resin, polyamide resin, phenol resin, and other resins, and also lead, zinc, copper, and other metals, or wood, rubber, paper, glass, other ceramics and various materials, which may be selectively used depending on the purpose or application.

In particular, the filling member 3 is made of preliminarily formed synthetic resin material, and the dimension of the filling member 3 is defined so as to be larger by 0.5 to 1.5%, preferably 0.7 to 1.3% than the dimension of the opening of the counterbore hole 2 loading the bolt 1 in which the filling member 3 is filled or the hole 1b of the bolt head 1a.

For example, in the case of a bolt 1 having a square hole 1b in the bolt head 1a, supposing the dimension of two opposing sides of the opening of the square hole 1b to be 19.16 mm, preferably the dimension of the filling member 3 may be formed in approximately 19.35} 0.05 mm.

As a result, the filling member 3 may be installed or detached easily, and releasing of the sealing member 3 during use can be prevented securely.

Moreover, the filling member 3 may not be particularly limited to fiber-reinforced polyamide resin, but it is preferred to use, for example, Nylon 66 containing 30% glass fiber (heat resistance exceeding 240° C.) (monomer casting nylon manufactured by Nippon Polypenco).

As a result, wear of the filling member 3 during use can be reduced.

Preferably, the bottom of the filling member 3 may be formed in a flat surface.

As a result, a space can be formed inside of the position of loading the filling member 3 of the counterbore hole 2 loaded with the bolt 1 or the hole 1b of the bolt hole 1a, so that the filling member may be detached easily.

On the other hand, the filled and solidified materials include epoxy resin, polyurethane resin, other curable resin, cement (non-shrink), and other filled and solidified materials, which may be selected depending on the purpose and application.

The detaching method of a filling member of the invention relates, as shown in FIG. 1 and FIG. 2, to a method of detaching the filling member 3 applied to fill in the space of a counterbore hole 2 loaded with a bolt 1 so that the bolt head 1a may sink inside of the counter bore hole 2 and/or the filling member 3 applied to fill in the hole 1b of the bolt head 1a of the bolt 1, from the space of the counterbore hole 2 and/or the hole 1b of the bolt head 1a, and more specifically by applying an extracting force to the filling member 3, the filling member 3 is pulled out of the space of the counterbore hole 2 and/or the hole 1b of the bolt head 1a.

Figures 3A, 3B, 3C, 3D:
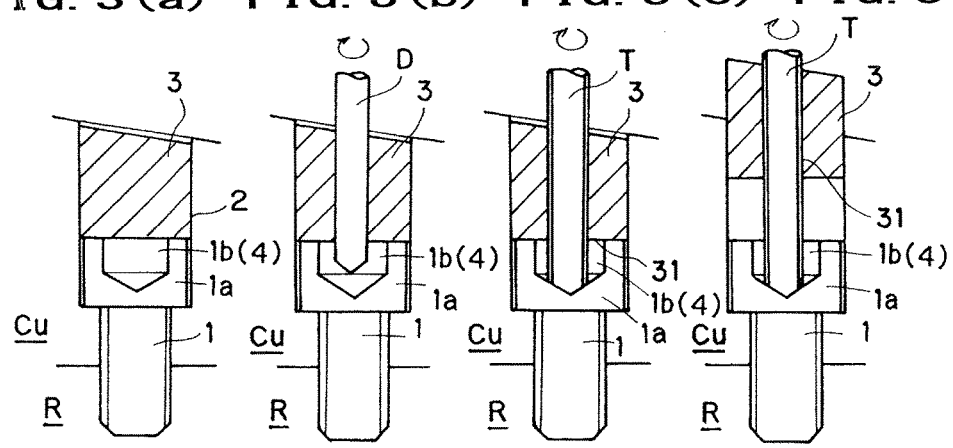
FIG. 3 is an explanatory diagram showing an embodiment of a detaching method of a filling member of a first invention of the present application.
Figure 4A:
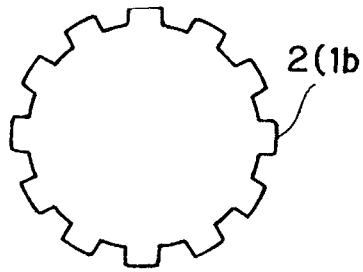
FIG. 4 is an explanatory diagram showing an example of a filling member and a counterbore hole applied in the same embodiment.
Figure 4B:
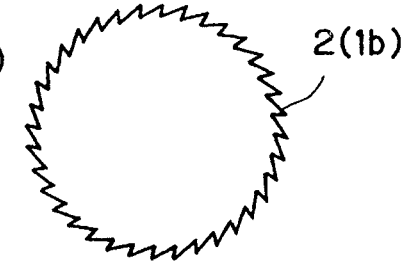
Figure 4C:
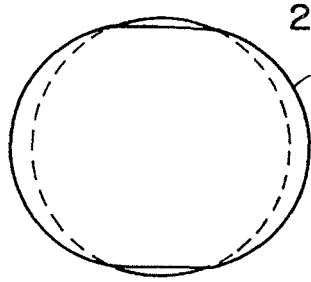
Figure 4D:
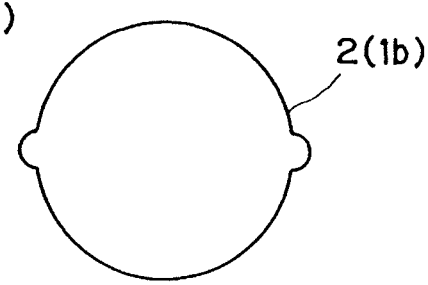

An exemplary embodiment of this detaching method of a filling member is described in FIG. 3.

In this method of detaching the filling member, a prepared hole is made in the filling member 3 by using a drill D, and while female threads 31 are formed in the filling member 3 by tapping process, an extracting force is applied to the filling member 3 by way of the female threads 31 engaged with the rotating tap T, so that the filling member 3 can be pulled out of the space of the counterbore hole 2.

In this case, when making a prepared hole in the filling member 3 by the drill D, since the hole 1b (space 4) of the bolt head 1a is present, it can be easily recognized that the prepared hole has penetrated the filling member 3, so that the wear of the drill D and the working time loss can be reduced.

The prepared hole in the filling member 3 may be formed preliminarily before preliminary forming of the filling member 3.

Instead of the tap T, by using a tap drill, the forming process of the prepared hole by the drill D can be omitted.

Incidentally, in order to applying an extracting force to the filling member 3 by way of the female threads engaged with the rotating tap T while forming the female threads 31 in the filling member 3 by the tapping process, it is required that the filling member 3 may not rotate (together with the tap T) in the space of the counterbore hole 2 and/or the hole 1b of the bolt head 1a.

For this purpose, in the case of preliminary forming of the filling member 3, on the outer circumference of the filling member 3, preferably, it is desired to form preliminarily undulations such as spline, gear, knurling, or horizontal grooves for increasing the frictional force against the inner circumference of the space of the counterbore hole 2 and/or the hole 1b of the bolt head 1a.

Also as shown in FIG. 4, the shape of the space of the counterbore hole 2 and/or the hole 1b of the bolt head 1a may be formed in other shape than a true circle, and the loaded filling member 3 (the preliminarily formed material or the filled and solidified material) may not rotate in the space of the counterbore hole 2 and/or in the hole 1b of the bolt head 1a.

In addition, by applying an extracting force to the filling member 3, in the method of pulling out the filling member 3 from the space of the counterbore hole 2 and/or the hole 1b of the bolt head 1a, an extracting force may be applied to the filling member 3, such as a corkscrew, and a spiral or screw shape (not shown) may be driven in, and an extracting force acts on the filling member by way of the screw, so that the filling member 3 may be pulled out of the space of the counterbore hole 2 and/or the hole 1b of the bolt head 1a.

In other method of than the method of applying an extracting force to the filling member 3, a pushing force may be applied to the filling member 3 from the bottom side of the counterbore hole 2 and/or from the bottom side of the hole 1b of the bolt head 1a, so that the filling member 3 can be pushed out from the space of the counterbore hole 2 and/or the hole 1b of the bolt head 1a .

Figure 5A:
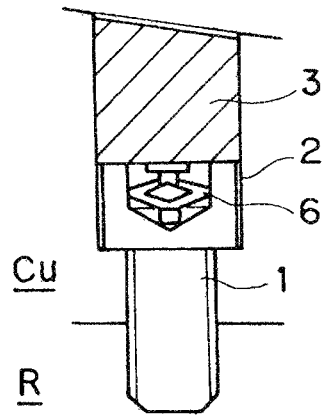
FIG. 5 is an explanatory diagram showing an embodiment of a detaching method of a filling member of a second invention of the present application.
Figure 5B:
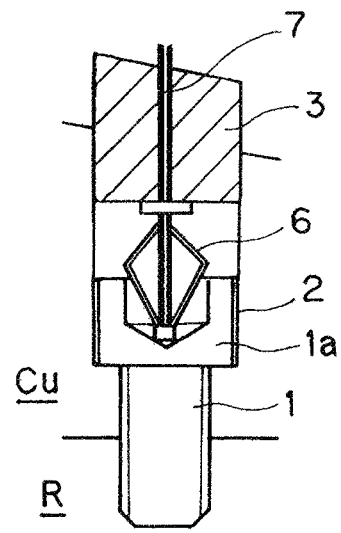
Figure 5C:
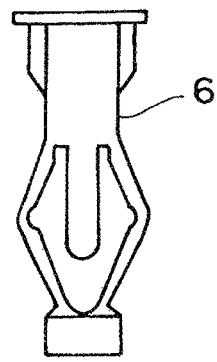

An exemplary embodiment of the detaching method of a filling member is described in FIG. 5.

In this detaching method of a filling member, when the filling member 3 is applied to fill in the space of the counterbore hole 2, preliminarily, a blind plug 6 (for example, trade name gNoble Anchor h) is interposed between the bolt head 1a (the bottom of hole 1b of the bolt head 1a) and the filling member 3 in a shrinkage state, and a screw 7 is driven in to expand (a method reverser to an ordinary method of use of the blind plug 6), and a pushing force is applied to the filling member 3, so that the filling member 3 is pushed out of the space of the counterbore hole 2.

Still more, by applying a pushing force to the filling member 3, in a method of pushing out the filling member 3 from the space of the counterbore hole 2 and/or the hole 1b of the bolt head 1a, for example, a fluid (oil, water, air, etc.) may be introduced between the bottom of the bolt head 1a and/or the hole 1b of the bolt head 1a and the filling member 3, and by the pressure of this fluid (oil pressure, water pressure, air pressure, etc.), a pushing force is applied to the filling member 3, so that the filling member 3 may be pushed out of the space of the counterbore hole 2 and/or the hole 1b of the bolt head 1a.

Incidentally, in the foregoing exemplary embodiments, the sectional shape of the counterbore hole 2 is circular, but as shown in the following exemplary embodiments (the cutter blade member applied in a shearing type grinder is called gcutter blade Cu h), the counterbore hole may be formed to have a certain slope spreading toward the outer side of the cutter blade Cu from a specified depth position of the counterbore hole.

Meanwhile, the portion of the counterbore hole not having the slope of the cutter blade Cu may be either filled with the filling member 3 or may not be filled to remain vacant.

Figure 6:
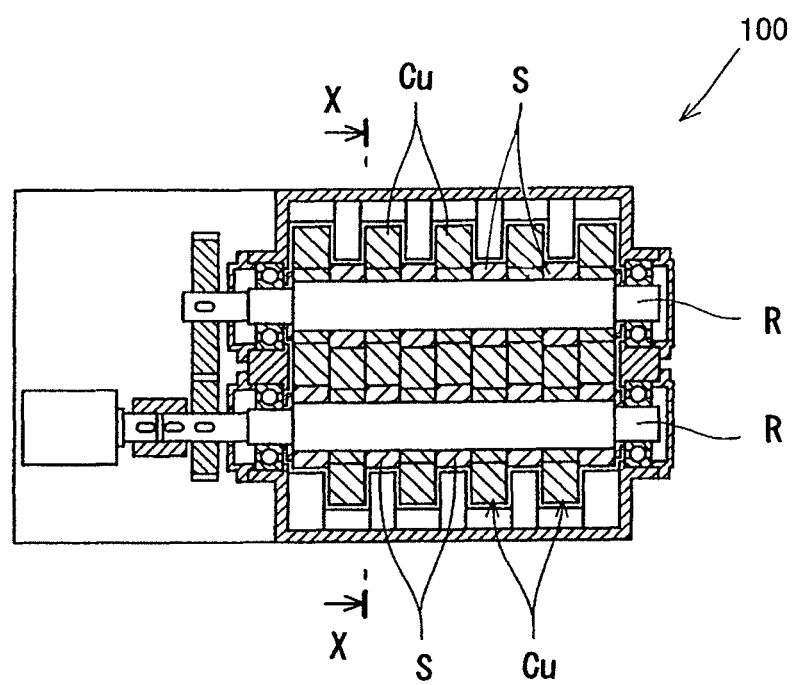
FIG. 6 is a plan view showing a shearing type grinder.
Figure 7:
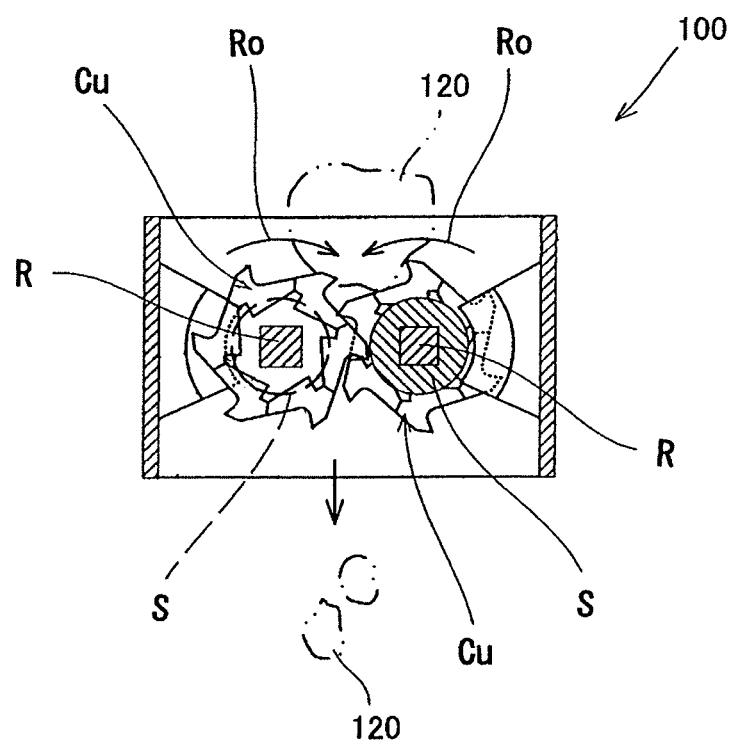
FIG. 7 is an X-X sectional view of FIG. 6.

The shearing type grinder to which the cutter blade Cu is applied includes, for example, a biaxial shearing type grinder 100 as shown in FIG. 6 and FIG. 7.

The biaxial shearing type grinder 100 has a plurality of cutter blades Cu and spacers S provided alternately in the axial direction of the rotating shaft as a rotating element main body R. The spacers S are used to position and fix the cutter blades Cu in the axial direction.

Figure 8A:
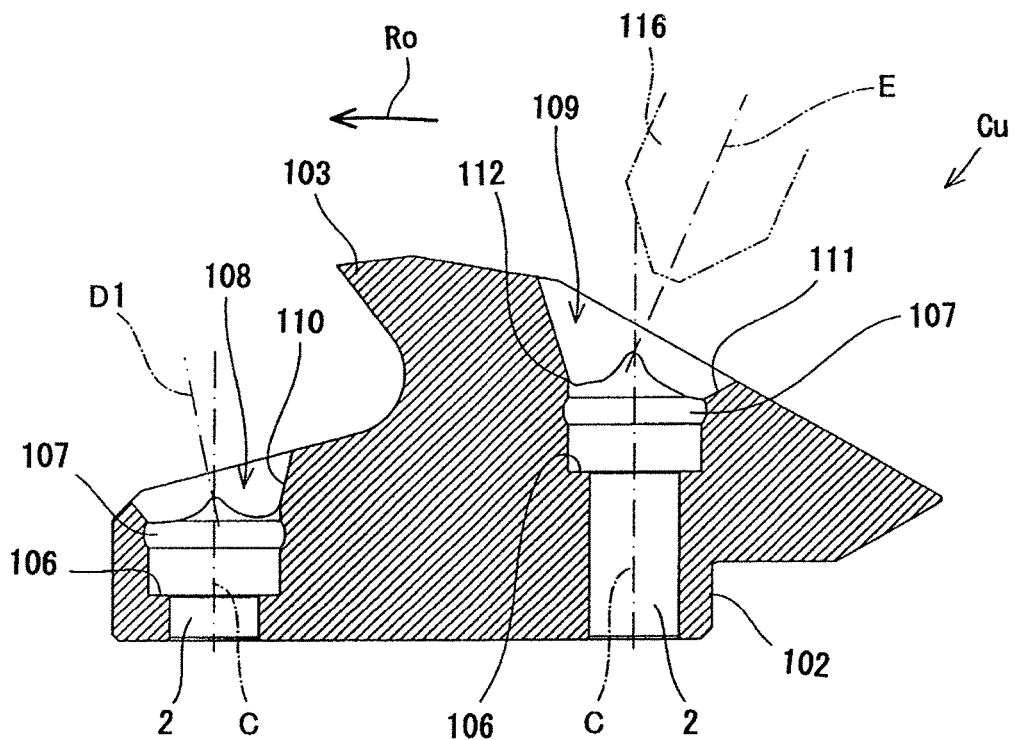
FIG. 8 shows a cutter blade according to a first exemplary embodiment of the present invention, in which (a) is a longitudinal sectional view, and (b) is a plan view.
Figure 8B:
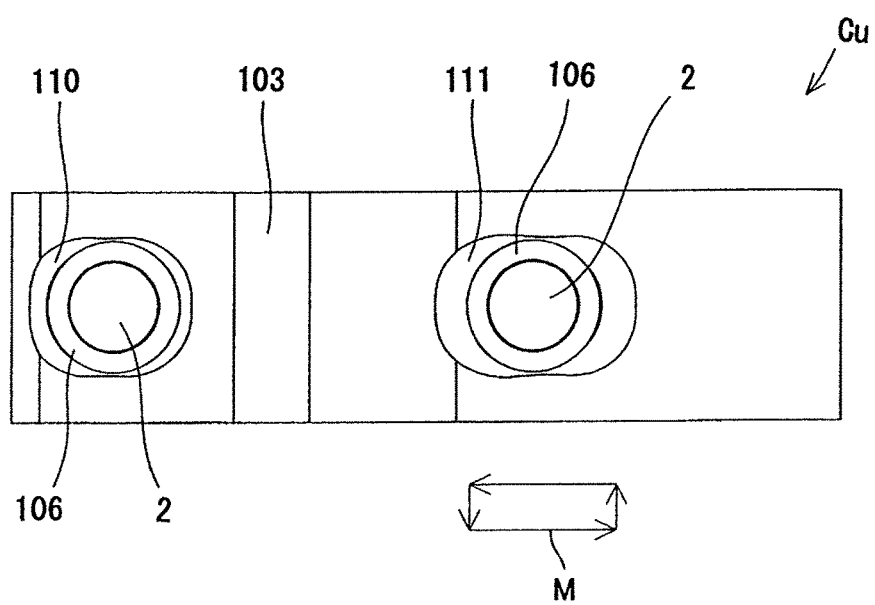

As shown in FIG. 8 (a), (b) and FIG. 9, the cutter blade Cu of the first embodiment has an engaging step 102 to be engaged with the rotating element main body R provided in a rear part of a rotating direction in an inner circumference, and has a blade part 103 provided in a central part of a peripheral direction in an outer circumference. This blade part 103 is pointed toward a rotating direction Ro shown in the drawing, and counterbore holes 2 are formed in front and rear positions of the peripheral direction of the blade part 103. The counterbore holes 2 are designed to mount the cutter blade Cu on a tool rest by way of bolts 1 (FIG. 10), and bolt seats 106 are formed at a specified depth. The counterbore hole 2 of the embodiment is provided with a concave groove 107 for stopping the special tool used when dismounting the cutter blade Cu from the rotating element main body R.

Figure 10:
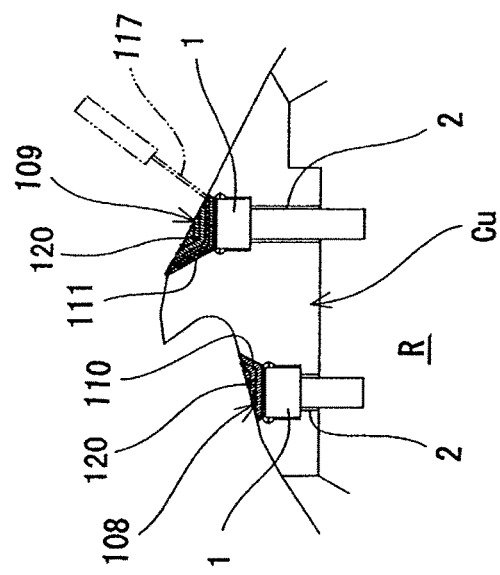
FIG. 10 schematically shows a clogged state of foreign matter in a mounting hole of a cutter blade shown in FIG. 8, in which (a) is a side view, and (b) is a partially magnified sectional view.
Figure 10:
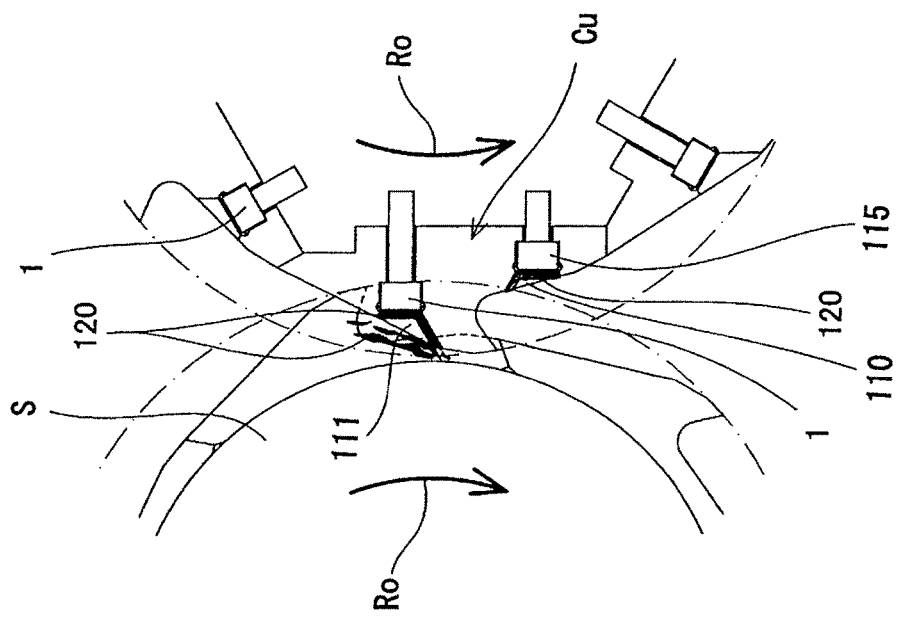

In bolt insert holes 108, 109 on the outer circumference of the counterbore hole 2, slopes 110, 111 spreading toward the outer side from a specified depth position 112 of the counterbore hole 2 are formed. The specified depth position 112 is preferred to be a position nearly above the head of a bolt 1 (FIG. 10). The slopes 110, 111 are inclined surfaces spreading toward the outer side of the longitudinal direction of the cutter blade outer circumference (the lateral direction in FIG. 8 (b)), and in this embodiment, the slopes are spreading also toward the thickness direction of the cutter blade Cu (the vertical direction in FIG. 8 (b)). The slopes 110, 111 are preferably inclined surfaces spreading in the longitudinal direction of the rotating direction of the outer surface of the cutter blade Cu.

The slopes 110, 111 are formed by machining to form bolt seats 106, and moving a machining tool 116 along an arrow M shown in FIG. 8 (b). This machining tool 116 is a taper end mill. Machining of the slopes 110, 111 by the machining tool 116 is achieved by positioning the axial line of the machining tool 116 on an axial line nearly orthogonal to the outer surface of the cutter blade Cu at the position of the counterbore hole 2, and moving this machining tool 116 along arrow M in a peripheral direction and a thickness direction of the cutter blade Cu.

In the illustrated example, in the case of the counterbore hole 2 ahead of the peripheral direction (the left side of the drawing), since the tool axial line D1 orthogonal to the outer surface is inclined forward in the rotating direction toward the central line C of the counterbore hole 2, the inclined tool axial line D1 is utilized as the axial line of the machining tool 116, and the machining tool 116 is moved along arrow M, so that the slope 110 is formed. On the other hand, in the case of the counterbore hole 2 behind the peripheral direction (the right side of the drawing), since the tool axial line E orthogonal to the outer surface is inclined backward in the rotating direction toward the central line of the counterbore hole 2, the inclined tool axial line E is utilized as the axial line of the machining tool 116, and the machining tool 116 is moved along arrow M, so that the slope 111 is formed. Meanwhile, when forming the slopes 110, 111, it may be designed to machine by inclining in the longitudinal direction with respect to the machining tool 116.

Consequently, in the counterbore hole 2 behind the rotating direction of the blade part 103, the slope 111 is inclined at a larger angle behind the rotating direction with respect to the angle ahead of the rotating direction, so that hooking of foreign matter such as broken piece (hereinafter referred to foreign matter 120 simply) is prevented, and clogging of foreign matter 120 in the counterbore hole 2 due to compression in the opposing spacer S (FIG. 10) can be effectively prevented.

As shown in FIG. 10 (a), according to such cutter blade Cu, the foreign matter 120 flowing into the position of the counterbore hole 2 is suppressed from being hooked in the counterbore hole 2 due to the slopes 110, 111, and the foreign matter 120 continues to flow and escapes along the slopes 110, 111, and Is hardly collected on the counterbore hole 2.

Also as shown in FIG. 10 (b), if the counterbore hole 2 is clogged with the foreign matter 120, the surrounding contact frictional force is weaker than in the prior art owing to the presence of the slopes 110, 111, and the foreign matter 120 can be easily removed by prying open between the foreign matter 120 and the slope 111 (110) by using a tool 117 such as a screwdriver.

That is, if the foreign matter 120 flows into the position of the counterbore hole 2, it is prevented from staying at the position of the counterbore hole 2 due to the slopes 110, 111, and if clogged incidentally, since the surrounding of the foreign matter 120 is contacting with the slopes 110, 111, and another foreign matter 120 may be pressed obliquely, the previously staying foreign matter 120 may be removed, and clogging of foreign matter 120 may be effectively prevented. If, however, clogged with the foreign matter 120, the staying foreign matter 10 is contacting with the surrounding slopes 110, 111 with a weak frictional force, and can be easily removed by a tool 117 or the like.

Figure 11:
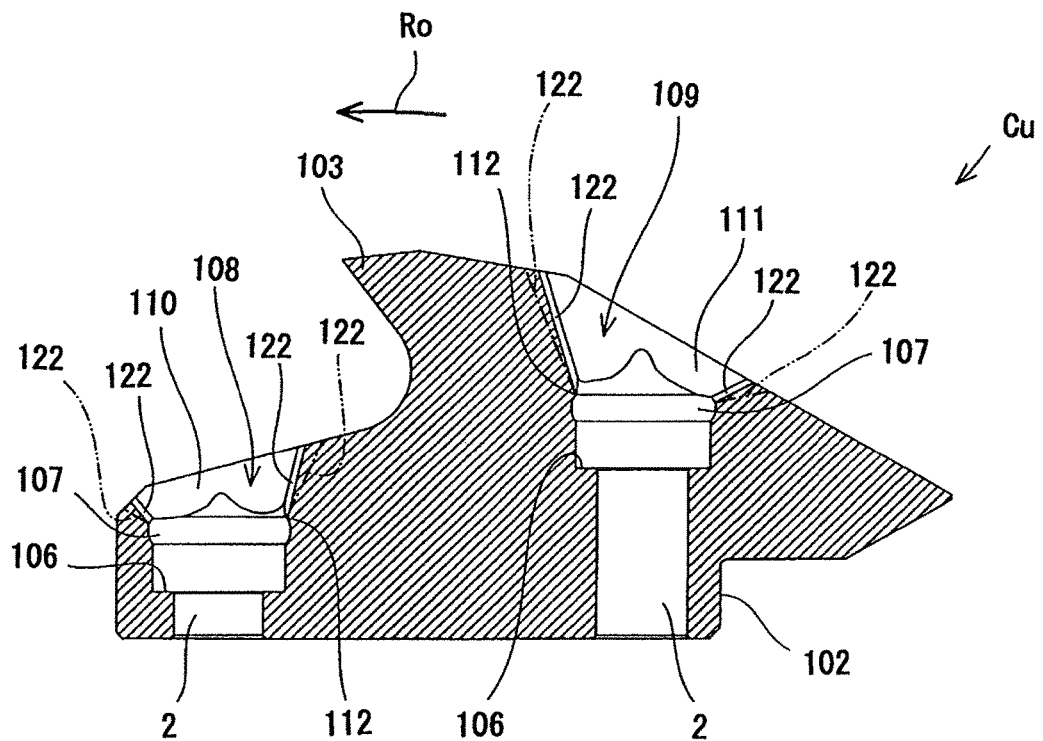
FIG. 11 shows a cutter blade according to a second exemplary embodiment of the present invention, in which (a) is a longitudinal sectional view, and (b) is a plan view.
Figure 11:
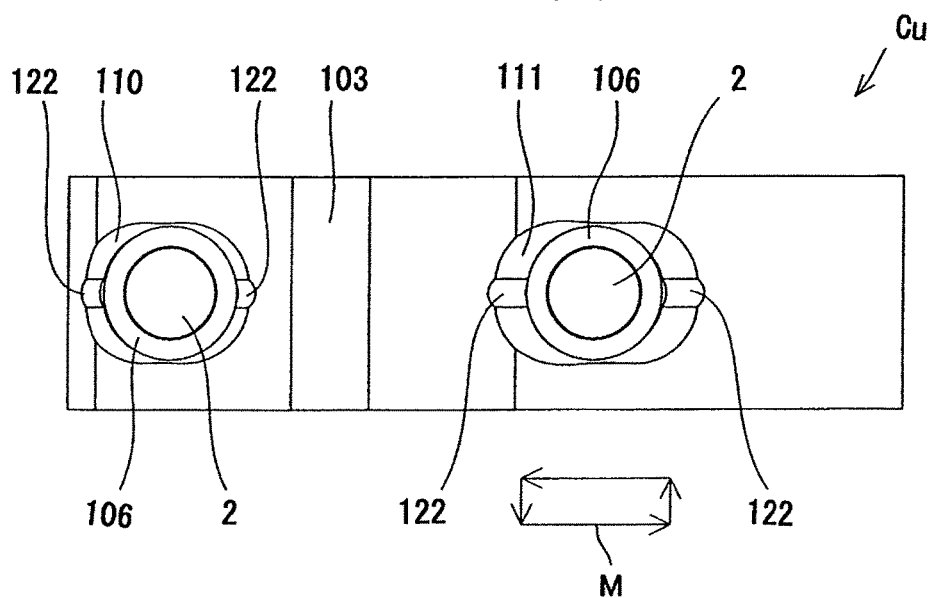
Figure 12:
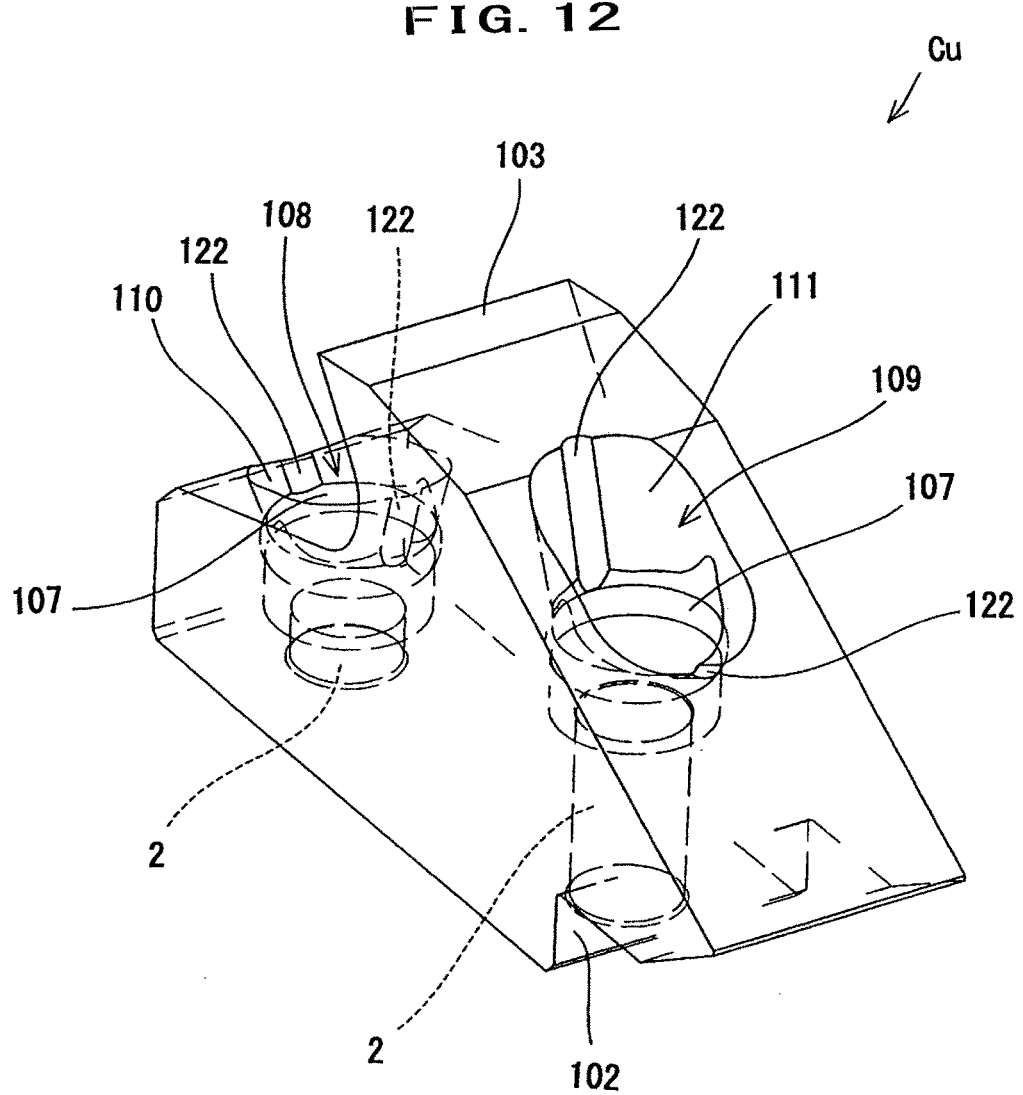
FIG. 12 is a perspective view of the cutter blade shown in FIG. 11.

As shown in FIG. 11 (a), (b) and FIG. 12, the cutter blade Cu of the second embodiment is same in mode as the cutter blade Cu of the first embodiment, except that concave grooves 122 are formed in the slopes 110, 111, in order to remove the foreign matter 120 (FIG. 10) collected on the upper part of the counterbore hole 2, easily by a tool. The other configuration is same as in the first embodiment, and identical components are identified with same reference numerals.

The concave grooves 122 provided in the slopes 110, 111 of the cutter blade Cu are formed in a specified concave shape toward the counterbore hole 2 from the cutter blade outer side along the slopes 110, 111. The concave groove 122 may be a groove of same depth as indicated by a solid line from the outer side of the cutter blade Cu to a proper position of the counterbore hole 2, but alternatively as shown by a double dot chain line, it may be formed in a taper shape, being deeper at the outer side end face of the cutter blade Cu, and being shallower at the side end of the counterbore hole 2. By the presence of this concave groove 122, if the foreign matter 120 is collected on the slopes 110, 111, the foreign matter 120 can be easily removed by pushing the tool 117 into the concave groove 122 to clear. The concave groove 122 may be formed in a desired sectional shape, such as V-shape, U-shape, or concave shape. The other configuration is same as in the cutter blade Cu of the first embodiment.

According to such cutter blade Cu, if the foreign matter 120 is collected on the slopes 110, 111, by pushing the tool 117 into the concave groove 122 to push up, since the frictional contact between the foreign matter 120 and the slopes 110, 111 is very small, the foreign matter 120 can be easily removed from the slopes 110, 111, and the cutter blade Cu can be exchanged efficiently.

Further, as described above, when the cutter blade outer side end face of the concave groove 122 is formed deeper, the tool 117 may be pushed in more easily, and in this case the loaded foreign matter 120 may be removed more efficiently.

Figure 13:
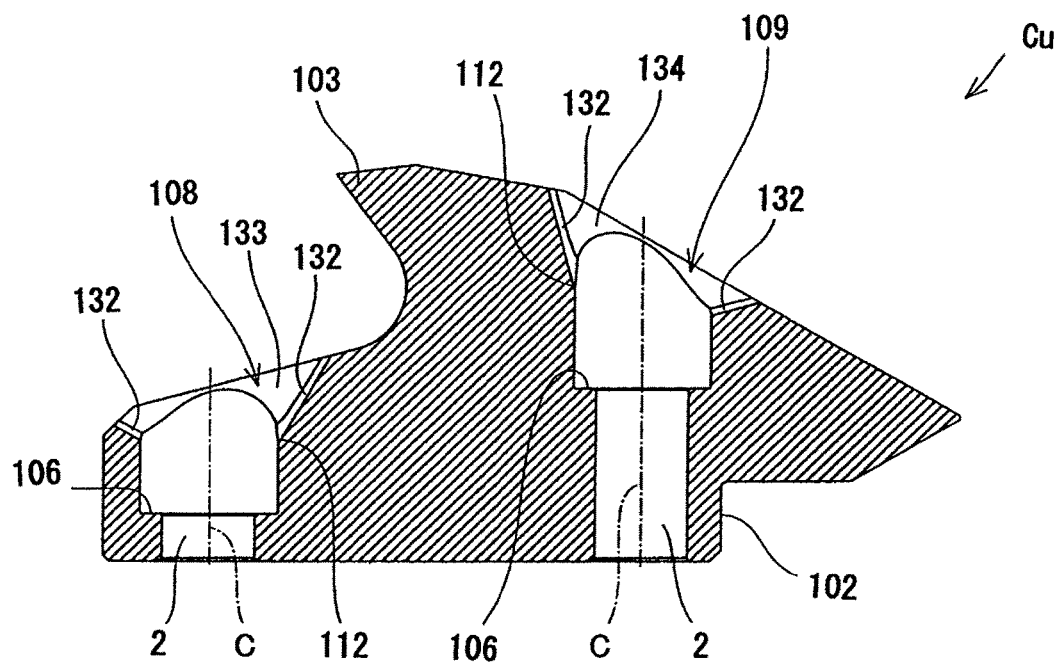
FIG. 13 shows a cutter blade according to a third exemplary embodiment of the present invention, in which (a) is a longitudinal sectional view, and (b) is a plan view.
Figure 13:
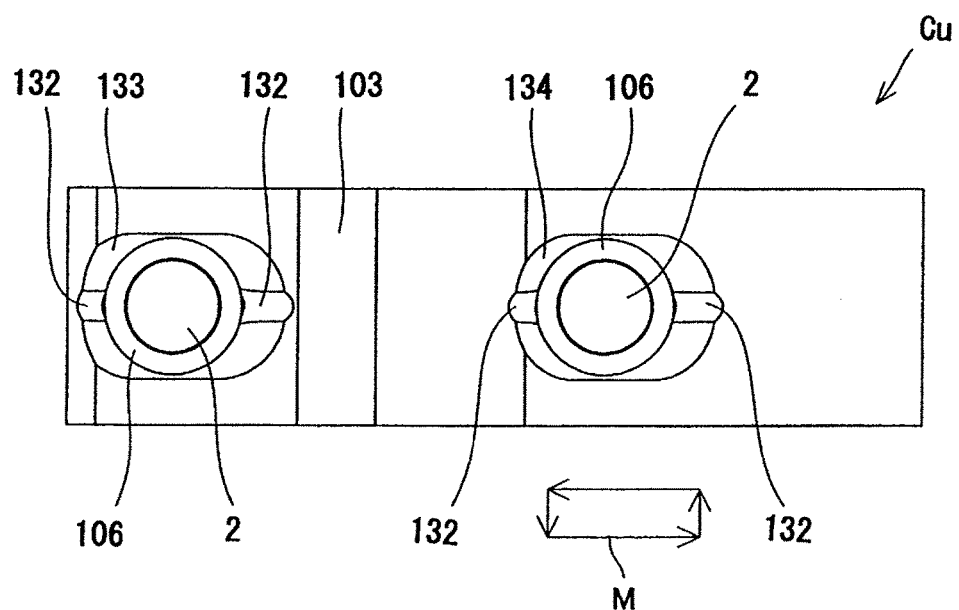
Figure 14:
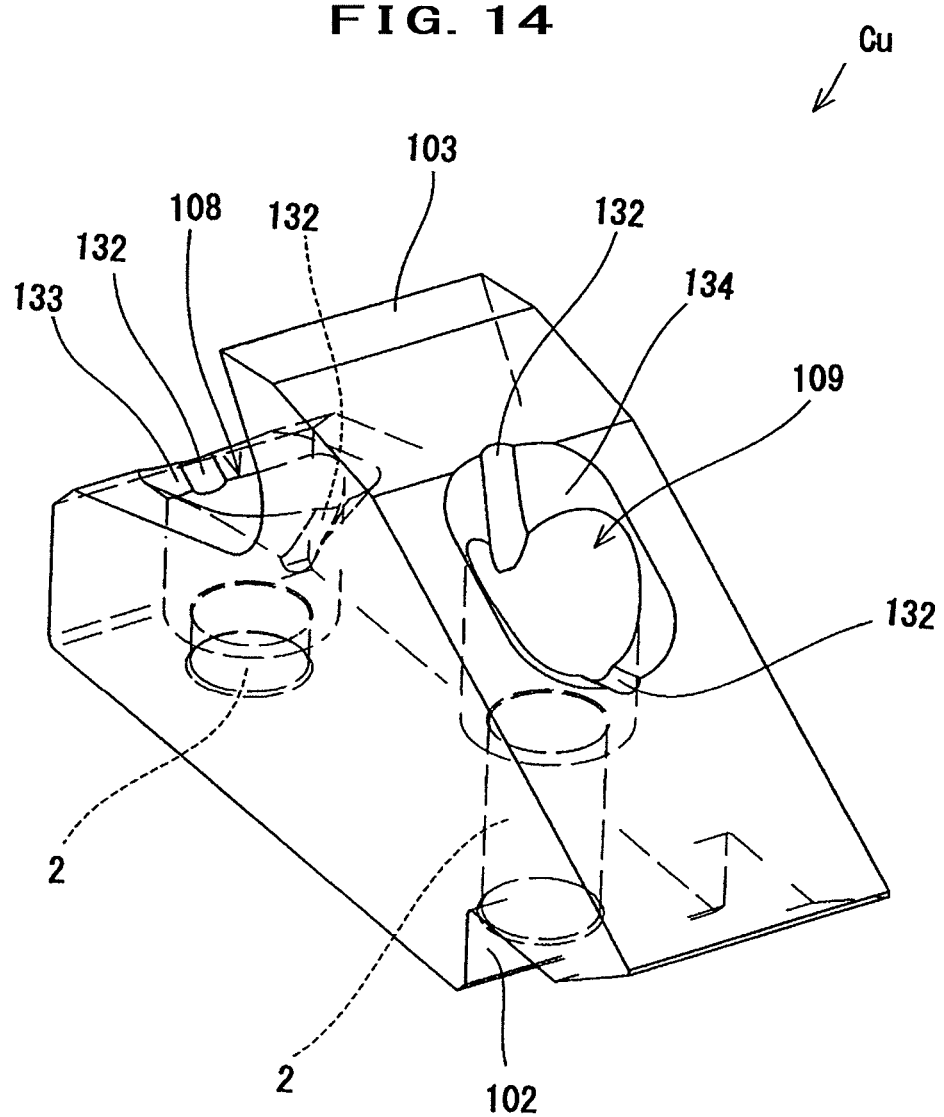
FIG. 14 is a perspective view of the cutter blade shown in FIG. 13.

As shown in FIG. 13 (a), (b) and FIG. 14, the cutter blade Cu of the third embodiment is same in mode as the cutter blade Cu of the second embodiment, except that concave grooves 107 are not formed, and that the type of the machining tool (not shown) for forming slopes 133, 134 is different. The other configuration is same as in the second embodiment, and identical components are identified with same reference numerals.

In this cutter blade Cu, the slopes 133, 134 are formed by using a machining tool of a large taper angle, and the inclination angle of the slopes 133, 134 is largely inclined in the longitudinal direction of the cutter blade outer surface as compared with the slopes 110, 111 in the second embodiment.

According to such cutter blade Cu, since the slopes 133, 134 have a large inclination angle from the head of the bolt 1 which is inserted into the counterbore hole 2 to the outer surface of the cutter blade Cu, clogging of the foreign matter 120 may be prevented more securely. In addition, in this embodiment, too, since the concave groove 132 is provided, if the foreign matter 120 is caught in the slopes 133, 134, it can be easily removed by pushing the tool 117 into the concave groove 132.

Figure 15:
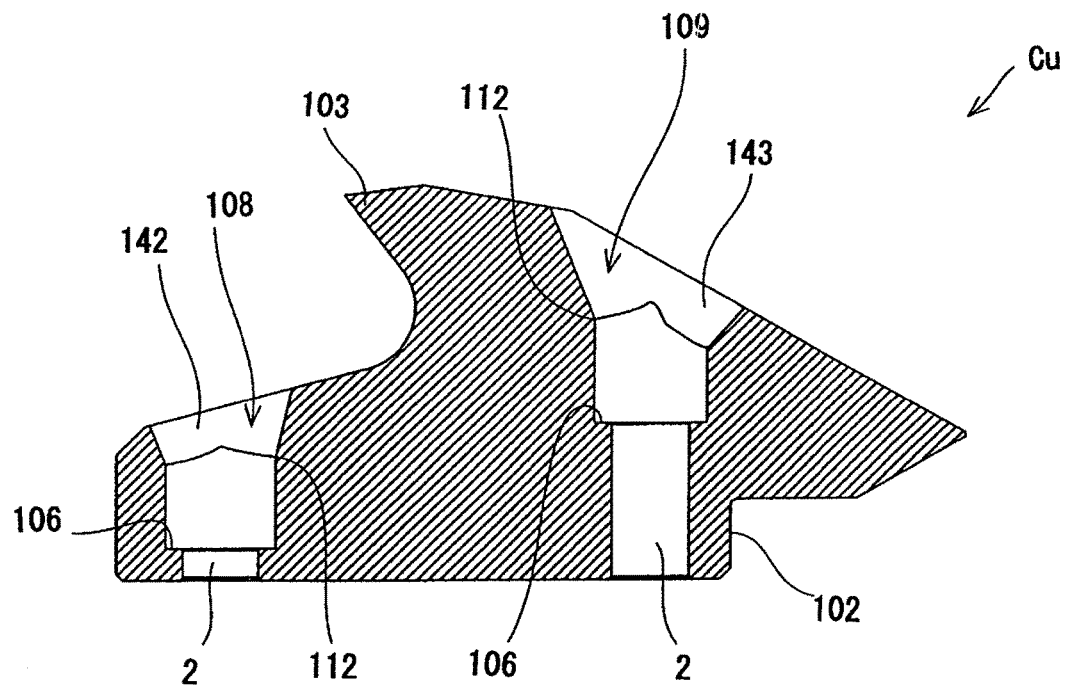
FIG. 15 shows a cutter blade according to a fourth exemplary embodiment of the present invention, in which (a) is a longitudinal sectional view, and (b) is a plan view.
Figure 15:
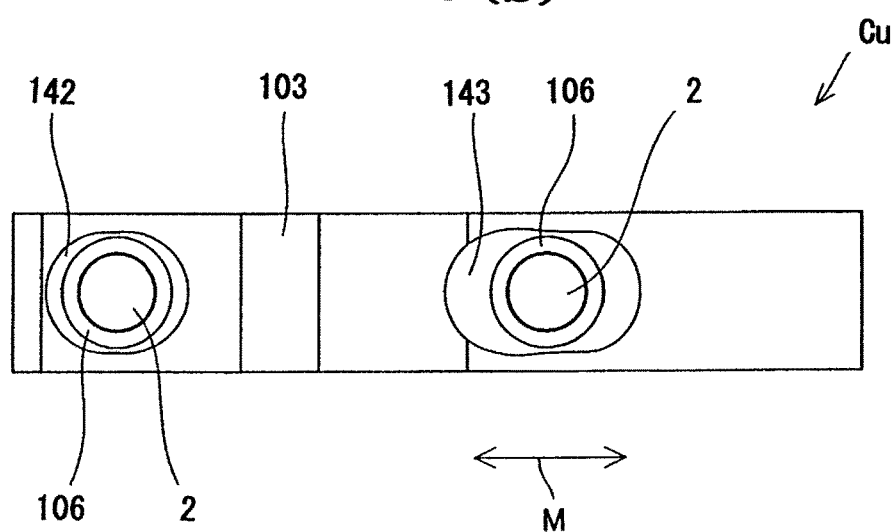
Figure 16:
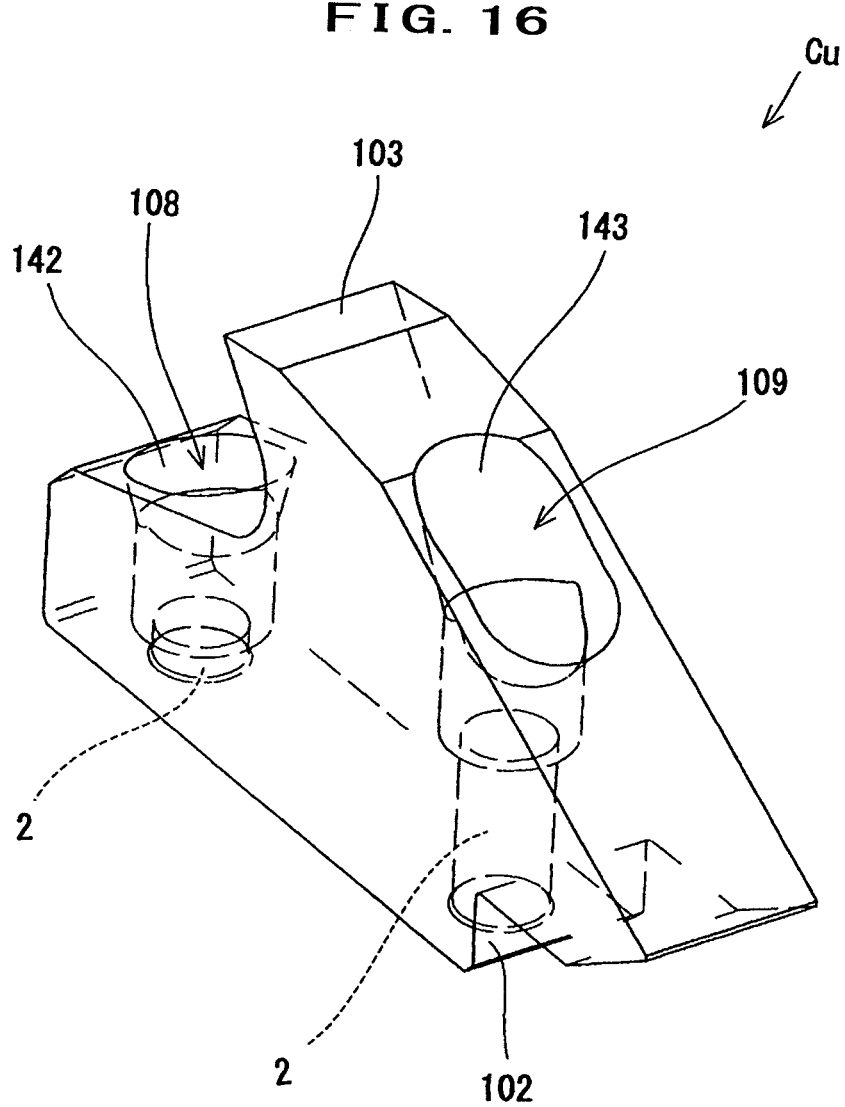
FIG. 16 is a perspective view of the cutter blade shown in FIG. 15.

Further, as shown in FIG. 15 (a), (b) and FIG. 16, the cutter blade Cu of the fourth embodiment is a cutter blade small in thickness as compared with the cutter blade Cu of the first embodiment, and concave grooves 107 are not formed. The side surface configuration is same as that of the first embodiment, and identical components are identified with same reference numerals.

Since this cutter blade Cu is small in thickness, slopes 142, 143 spreading from a specified depth position of the counterbore hole 2 are formed so as to incline only in the longitudinal direction (the lateral direction in FIG. 15) of the cutter blade Cu. After machining to form bolt seats 106, the slopes 142, 143 are formed while moving the machining tool in the longitudinal direction of the cutter blade Cu, according to the arrow M showing the path of the machining tool as shown in the drawing. As the machining tool, a taper end mill is used.

By using such cutter tool Cu, if the foreign matter 120 is caught in the slopes 142, 143, the contact frictional force of the foreign matter 120 and the circumference of the slopes 142, 143 is small, and the foreign matter 120 can be easily removed by the tool 117 or the like.

Figure 17:
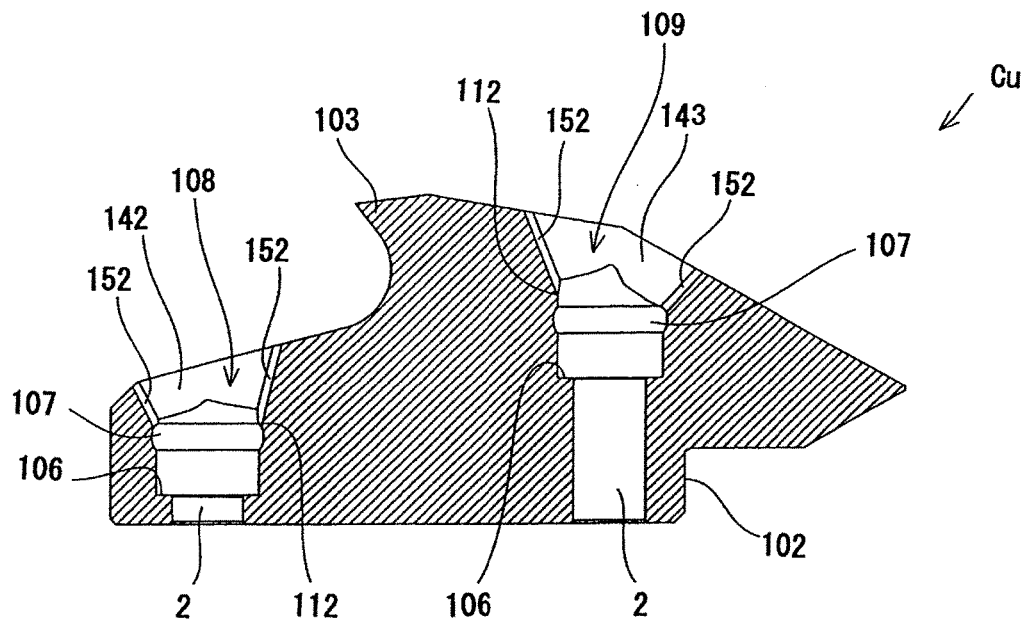
FIG. 17 shows a cutter blade according to a fifth exemplary embodiment of the present invention, in which (a) is a longitudinal sectional view, and (b) is a plan view.
Figure 17:
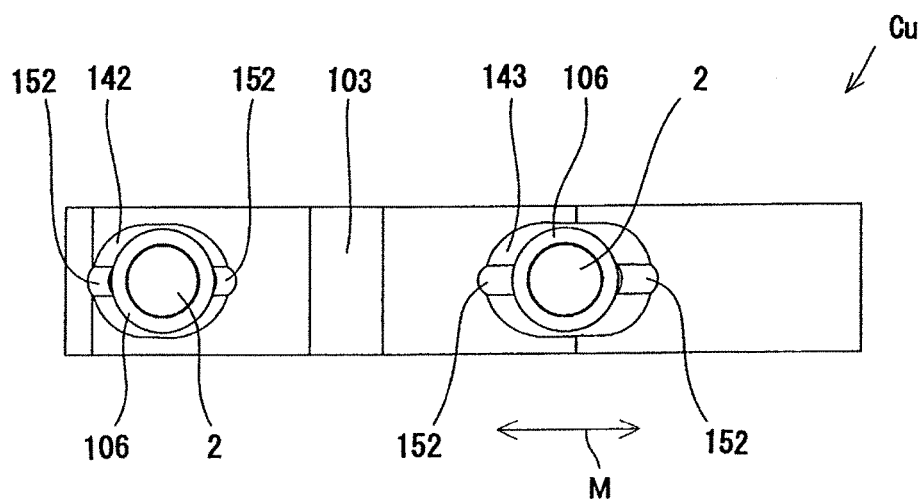

Moreover, as shown in FIG. 17 (a), (b) and FIG. 18, the cutter blade Cu of the fifth embodiment is smaller in the projection amount of the blade part 103 as compared with the cutter blade Cu of the fourth embodiment, and is provided with concave grooves 152 for pushing the tool 117 into the slopes 142, 143. The other configuration is same as in the fourth embodiment, and identical components are identified with same reference numerals.

The concave grooves 152 provided in the slopes 142, 143 of the cutter blade Cu are provided in a concave form at a specified depth toward the counterbore hole 2 from the cutter blade outer surface along the slopes 142, 143. According to this concave groove 152, if the foreign matter 152 is caught in the slopes 142, 143, the foreign matter 120 can be removed easily by pushing the tool 117 into the concave groove 152. The concave groove 152 may be formed in a desired sectional shape, such as V-shape, U-shape, or concave shape.

According to such cutter blade Cu, if the foreign matter 120 is caught in the slopes 142, 143, by pushing the tool 117 into the concave groove 152 and moving up, since the frictional resistance between the foreign matter 120 and the slopes 142, 143 is small, the foreign matter 120 can be easily removed from the slopes 142, 143, and the cutter blade Cu can be exchanged efficiently.

As described herein, according to this cutter blade Cu, if the foreign matter 120 is caught in the bolt insert parts 108, 109 of the counterbore hole 2, the foreign matter 120 can be easily removed, and the cutter blade Cu can be exchanged efficiently and promptly. Therefore, drop of operation efficiency of the shearing type grinder can be suppressed, and the grinder can be utilized systematically.

In the foregoing embodiments, the cutter blade Cu of a similar sectional shape is explained, but it may be applied similarly in other embodiments, and the thickness of the cutter blade Cu may be a thickness other than the thickness of the embodiments, and the shape of the cutter blade Cu is not limited to the illustrated embodiments alone.

The cutter blade Cu is explained in a configuration having concave grooves 122, 132, 152 for stopping the machining tool when dismounting, but if the cutter blade Cu is not provided with concave grooves 122, 132, 152, it is possible to remove the foreign matter 120 caught in the slopes 110, 111, 142, 143 easily, and in the absence of the concave grooves 122, 132, 152, the working efficiency can be enhanced, and whether the concave grooves 122, 132, 152 may be provided or not may be appropriately determined depending on the condition of use or the like.

Moreover, the slopes 110, 111, 133, 134, 142, 143 are preferably formed on the slopes spreading in the longitudinal direction on the outer circumference of the cutter blade Cu, but alternately may be formed on the slopes extending in the width direction orthogonal to the rotating direction on the outer circumference of the cutter blade Cu, or one of the opposing slopes may be formed on a vertical plane, and such exceptional examples should not be exempted.

In the detaching method of a filling member of the invention, the filling member used therein, and the cutter blade using this filling member, the invention is described herein on the basis of plural embodiments, but the invention is not limited to the illustrated embodiments alone, and may be changed and modified within a scope not departing from the true spirit thereof.

INDUSTRIAL APPLICABILITY

The detaching method of a filling member of the invention, the filling member used therein, and the cutter blade using this filling member are capable of detaching easily the filling member caught in the space of the counterbore hole or the hole of the bolt head in a tight state, and therefore, for example, in a case of a grinder or the like, designed to mount a blade member on a rotating element main body by a bolt so as to be exchanged easily, the filling member may be loaded in a tight state so that the filling member may not be detached easily during use, and it is easily applicable to a case of, for example, removing the bolt and repairing or replacing the member.

DESCRIPTION OF THE REFERENCE NUMERALS bolt
1a bolt head
1b hole
2 counterbore hole
3 filling member
31 female thread
4 space
5 isolation member
6 blind plug
7 screw
110, 111, 133, 134, 142, 143 slope
Cu tip member (cutter blade)
D drill
T tap
R rotating element main body

What is claimed is:

1. A detaching method of a filling member, comprising:
   detaching the filling member, wherein the filling member has been applied to fill in a space of a counterbore hole having a socket head bolt loaded so that a bolt head of the socket head bolt may sink into an inside of the counterbore hole,
   wherein a prepared hole is made in the filling member, and a female thread is formed in the prepared hole by tapping, such that an extracting force is applied to the filling member through the female thread engaged with a rotating tap to extract the filling member from the space of the counterbore hole,
   wherein the counterbore hole has a longitudinal axis extending in an axial direction in which the counterbore hole is longest,
   wherein the space of the counterbore hole extends in a radial direction perpendicular to the longitudinal axis of the counterbore hole,
   wherein an outer perimeter of a cross-sectional shape of the space of the counterbore hole in the radial direction perpendicular to the longitudinal axis of the counterbore hole is noncircular; and
   wherein the cross-sectional shape of the shape of the counterbore hole in the radial direction perpendicular to the longitudinal axis of the counterbore hole is a toothed shape having a plurality of pointed teeth spaced around the outer perimeter of the cross-sectional shape of the space of the counterbore hole in the radial direction perpendicular to the longitudinal axis of the counterbore hole.

2. The detaching method of a filling member according to claim 1, wherein the filling member is composed of a preliminarily formed synthetic resin.

3. The detaching method of a filling member according to claim 2, wherein a dimension of the filling member is defined so as to be larger by 0.5 to 1.5% than a dimension of an opening of the counterbore hole loaded with the socket head bolt in which the filling member is filled.

4. The detaching method of a filling member according to claim 2, wherein the filling member is composed of the preliminarily formed synthetic resin and a fiber-reinforced polyamide resin.

5. The detaching method of a filling member according to claim 2, wherein a bottom of the filling member is formed to have a flat surface.

6. The detaching method of a filling member according to claim 2, wherein the counterbore hole is formed in a cutter blade.

7. The detaching method of a filling member according to claim 6, wherein the counterbore hole has a slope spreading toward an outer side of the cutter blade from a position of a specified depth of the counterbore hole.

8. A detaching method of a filling member, comprising:
   detaching the filling member, wherein the filling member has been applied to fill in a space of a counterbore hole having a socket head bolt loaded so that a bolt head of the socket head bolt may sink into an inside of the counterbore hole,
   wherein a prepared hole is made in the filling member, and a female thread is formed in the prepared hole by tapping, such that an extracting force is applied to the filling member through the female thread engaged with a rotating tap to extract the filling member from the space of the counterbore hole,
   wherein the counterbore hole has a longitudinal axis extending in an axial direction in which the counterbore hole is longest,
   wherein the space of the counterbore hole extends in a radial direction perpendicular to the longitudinal axis of the counterbore hole,
   wherein an outer perimeter of a cross-sectional shape of the space of the counterbore hole in the radial direction perpendicular to the longitudinal axis of the counterbore hole is noncircular,
   wherein the counterbore hole is formed in a cutter blade,
   wherein the counterbore hole has a slope spreading toward an outer side of the cutter blade from a position of a specified depth of the counterbore hole, the slope being oblique with respect to the longitudinal axis of the counterbore hole,
   wherein a concave groove is provided in the slope such that the concave groove is recessed from the slope in the radial direction perpendicular to the longitudinal axis of the counterbore hole, the concave groove being oblique with respect to the longitudinal axis of the counterbore hole; and
   wherein the cross-sectional shape of the slope of the counterbore hole in the radial direction perpendicular to the longitudinal axis of the counterbore is a toothed shape having a plurality of pointed teeth spaced around the outer perimeter of the cross-sectional shape of the slope of the counterbore hole in the radial direction perpendicular to the longitudinal axis of the counterbore hole.

9. The detaching method of a filling member according to claim 6, wherein the counterbore hole is one of two counterbore holes formed in the cutter blade and a tip of the cutter blade is between the two counterbore holes.

* * * * *